(No Model.) 2 Sheets—Sheet 1.

J. GIBBONS.
GAS HEATER.

No. 462,920. Patented Nov. 10, 1891.

WITNESSES:

INVENTOR:
J. Gibbons
BY
Munn & Co.
ATTORNEYS (No Model.) 2 Sheets—Sheet 2.
J. GIBBONS.
GAS HEATER.
No. 462,920. Patented Nov. 10, 1891.
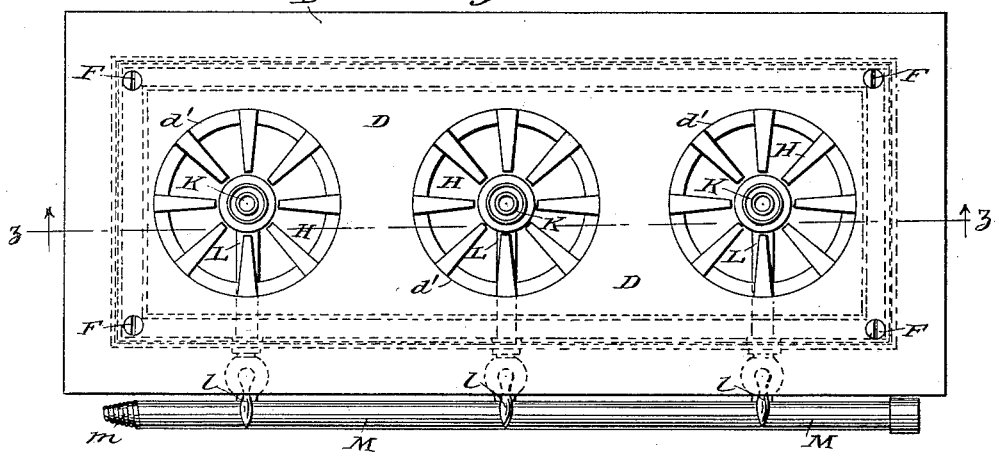
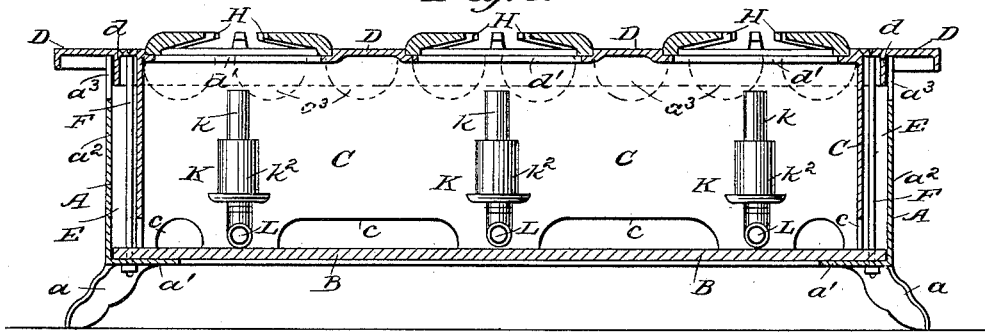
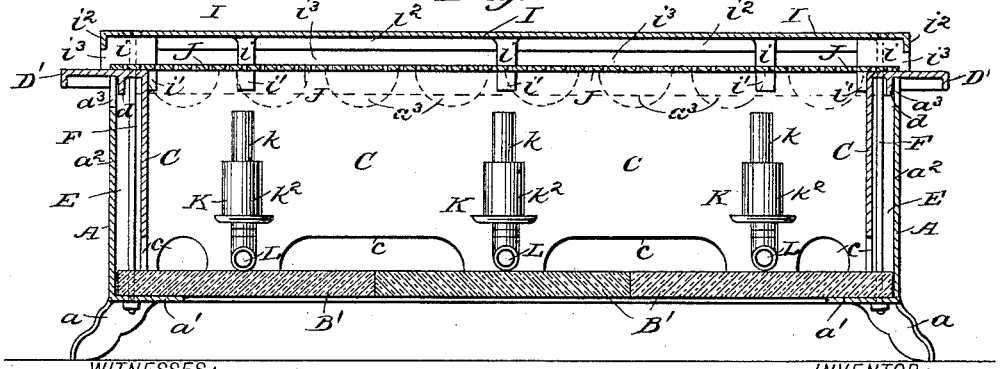
WITNESSES:
INVENTOR:
J. Gibbons
BY Munn & Co.
ATTORNEYS

UNITED STATES PATENT OFFICE.

JAMES GIBBONS, OF JERSEY CITY, NEW JERSEY, ASSIGNOR TO THE GIBBONS SUPERHEATING COMPANY, OF SAME PLACE.

GAS-HEATER.

SPECIFICATION forming part of Letters Patent No. 462,920, dated November 10, 1891.

Application filed May 27, 1890. Serial No. 353,374. (No model.)

*To all whom it may concern:*

Be it known that I, JAMES GIBBONS, of Jersey City, in the county of Hudson and State of New Jersey, have invented a new and Improved Gas-Heater, of which the following is a full, clear, and exact description.

My invention has for its object to provide a simple, inexpensive, and efficient flat or low heater intended more particularly for use with gas or fluid-fuel burners and adapted for economically heating laundry-irons and for cooking food supplies of various kinds by boiling them or by baking them on a griddle, the whole apparatus being capable of use with greater economy of fuel and increased safety against fire than other flat or low heaters of the same general character.

The invention consists in certain novel features of construction and combinations of parts of the gas-heater, all as hereinafter described and claimed.

Reference is to be had to the accompanying drawings, forming a part of this specification, in which similar letters of reference indicate corresponding parts in all the figures.

Figure 1:
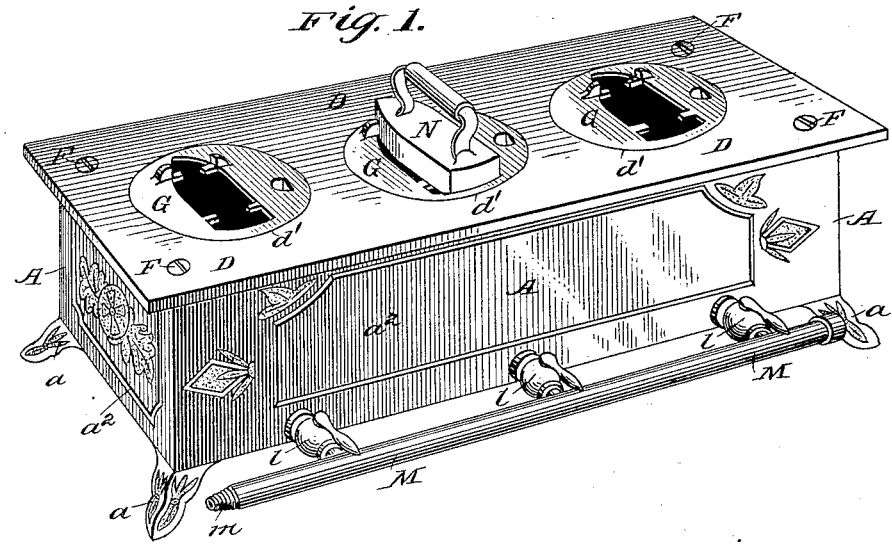
Figure 2:
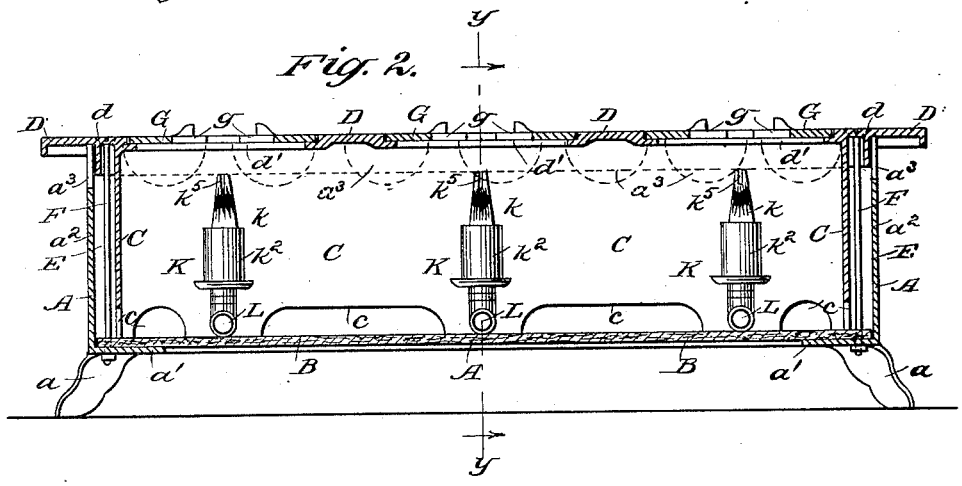
Figure 3:
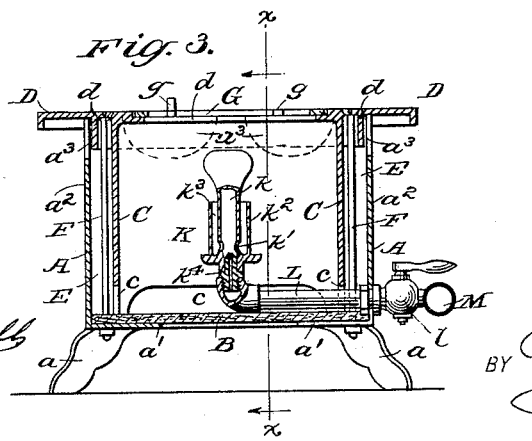

Figure 1 is a perspective view of my improved gas-heater as arranged for heating flat or laundry irons. Fig. 2 is a central longitudinal vertical section of the heater, taken on the line $x\,x$ in Fig. 3. Fig. 3 is a transverse vertical section taken on the line $y\,y$ in Fig. 2. Fig. 4 is a plan view of the heater as arranged for ordinary cooking operations. Fig. 5 is a longitudinal vertical sectional elevation of the heater shown in Fig. 4, and Fig. 6 is a longitudinal vertical sectional view of the heater as arranged for using a griddle for baking pancakes.

I first will particularly describe the invention with more special reference to Figs. 1, 2, and 3 of the drawings and as follows:

The heater has an outer main casing A, which is preferably made in rectangular form and of cast metal and has supporting-legs $a$ at the corners. The bottom portion $a'$ of this frame is preferably cut away at the center to secure lightness, and the sides $a^2$ of the frame are provided with upper notches or openings $a^3$ to admit atmospheric air for superheating it prior to its passage to the fluid-fuel burners to maintain combustion thereat, and as will be hereinafter more fully explained.

Gas-heaters of the same general character as the one herein described are in common use; but the bottoms of their fire-chambers are usually entirely open below the burners, or are not provided with an effective shield which protects the table or bench on which the heater rests from being overheated or charred by the burners. Furthermore, this downward deflection or radiation of heat from the burners to the bench or table not only entails danger from fire, but causes considerable waste of fluid fuel or gas. To obviate these disadvantages I have fitted at the bottom of the heater fire-chamber, and preferably within the sides of the frame A, a plate B, which is a non-conductor of heat and fully protects the bench or table on which the heater rests from the heat given off from the burners and the fluid-fuel-supply pipes to which the burners are directly connected. The plate or shield B also throws or deflects upward all the heat from the burners and pipes and causes it to be utilized for heating or cooking purposes at the top of the apparatus, thereby effecting considerable economy in fuel over the ordinary open-bottomed gas-heater, or one not provided with a bottom shield, which is a non-conductor of heat. The bottom plate or shield B may be a piece of asbestus, as shown in Figs. 2, 3, and 5, or may consist of one or more clay or other refractory bricks B'. (Shown in Fig. 6 of the drawings.)

In my improved gas-heater I employ an inner side plate or wall C, which is preferably cast with the top D of the apparatus, and is sufficiently smaller than the main side frame A to provide between it and the side wall $a^2$ of this frame a space E, which preferably extends entirely around the heater, and into which space or chamber atmospheric air is admitted through the upper openings $a^3$ of the side frame A, and from which space the air after being superheated by contact with the side plate or wall C is delivered through openings $c$, provided at the lower edge of the plate or wall C into the interior chamber or burner compartment, which is bounded by the bottom shield B, the wall C, and the top D of the apparatus. The plate or wall C may be made in one or more pieces separate from the heater-top and may be held within the main frame A in any approved manner to provide the air-superheating chamber E between the frame and wall and the lower openings $c$ above named. The top plate D has a pendent flange $d$, which fits loosely within the top of the main frame. By casting the wall C and flange $d$ (or an equivalent series of lugs) in one piece with the top plate D economy of manufacture is promoted, and four ordinary stove-bolts F applied one at each corner of the heater are sufficient to hold or bind together all the above-named parts in proper relative positions, as clearly shown in the drawings.

The apparatus shown in Figs. 1 to 5, inclusive, of the drawings is provided in its top plate D with a series of three holes $d'$, to which may be fitted the apertured covers G, (shown in Figs. 1, 2, and 3,) and provided with lugs $g$ to sustain a flat or laundry iron over the flame from one of the gas-burners, or the ordinary skeleton plates or caps H may be fitted to the top plate holes or openings $d'$, as shown in Figs. 4 and 5 of the drawings, for holding pots, kettles, pans, or other cooking-vessels over the burners.

In Fig. 6 of the drawings the top plate $D'$ is entirely open inside of the plate or wall C, which forms the air-superheating chamber E between it and the main frame A, and passages $a^3$ and $c$ in the parts A C respectively allow atmospheric air to enter the chamber E and pass from it when superheated to the interior burner-compartment of the apparatus. The top plate $D'$ also has a pendent flange $d$, which retains the wall C in proper relation to the side wall $a^2$ of the main frame to provide the air-superheating chamber E and steady the top plate on the main frame.

The griddle I is provided with a series of lugs $i$, which rest on the top plate $D'$ and have pendent lips or lugs $i'$, which lap onto the inner plate or wall C and hold the griddle in central position on the top plate. It will be noticed that the griddle is quite a little smaller marginally than the top plate $D'$ of the heater and that the pendent edge or marginal flange $i^2$ of the griddle is not so deep as its lugs $i$, thereby providing an opening $i^3$ all around between the griddle and the top plate to allow exit of hot products of combustion from the burners. By making the griddle I smaller marginally than the top plate $D'$ of the heater the hot products from the burners escaping through the opening or passage $i^3$ will rise immediately or directly from said opening and will not be so liable to be drawn downward and inward through the passages $a^3$ beneath the top plate and into the air-superheating chamber E to pass to the burners, as said hot products would be were the griddle I of equal area with the top plate. In other words, the atmospheric air entering the passages $a^3$ and passing through the superheating-chamber E and through the passages or openings $c$ into the burner-compartment to maintain combustion at the burners will not be mingled with spent or deoxygenized waste gases from the burners passing off through the outlet passage or opening $i^3$ beneath the margin of the griddle, and consequently a good supply of pure fully-oxygenated atmospheric air to the burners will always be assured to give them maximum heating power or effect, and this is a most important consideration.

In order to equalize the heating effect of the burners over the entire surface of the griddle to assure even baking of cakes thereon, I place beneath the griddle and a short distance from it a perforated metal plate J, which is preferably rested flat upon the top plate $D'$ of the heater, and has slots or openings through which the pendent lips $i'$ of the griddle-lugs $i$ pass. This plate or shield J receives directly the flames of the burners below it and spreads and breaks up the flames to cause them to issue in small jets through the perforations over its entire area to evenly heat the whole area of the cake-griddle.

The described construction and arrangement of the frame A, its bottom shield $B'$, the wall C, which rests on the bottom shield, and the top plate $D'$, griddle I, and heat deflecting or equalizing plate J allows all these parts to be secured together by four ordinary stove-bolts F, applied one at each corner of the heater, as clearly shown in the drawings.

The fluid-fuel burners K which I use in this gas-heater are an improved form of Bunsen burner made with a central mixing tube or stem $k$, which has air-inlet apertures $k'$ near its lower end, and is surrounded at its lower part by a cup-casing $k^2$, which forms a chamber $k^3$ between the stem and casing, through which air must pass and in which the air will be highly superheated by the stem prior to entering it at its apertures $k'$, and passing thence to the point of ignition, with a proper quantity or volume of gas admitted through a nipple $k^4$. This nipple is screwed into a gas-supply pipe L, which has a cock or valve $l$ and communicates with a gas service-pipe M, which ranges along the front side of the heater and is closed or plugged at one end and is adapted at its other open end $m$ for connection of a rubber or other gas-supply pipe. (Not shown in the drawings.)

It will be noticed that I pass the branch pipes L, to which the burners are connected, through the side of the casing and into the fire-chamber above the non-conducting bottom shield B, whereby the gas passing through the pipes is heated considerably before entering the burners, and the table or bench on which the heater rests is fully protected from heat, which otherwise would be radiated to it from the pipes L were they arranged below the non-conducting shield.

The burners used in the gas-heater shown in Figs. 4, 5, and 6 of the drawings have a round mixing and flame tube $k$, which gives a round body of flame well adapted for general cooking and heating purposes when either the skeleton caps H or the cake-griddle I are used on the heater-top; but I find in practice that the best results are obtained in the flat or laundry iron heater shown in Figs. 1, 2, and 3 of the drawings when I employ a Bunsen burner having at the extremity of its mixing-tube $k$ a broad flat opening or slit $k^5$, which produces a comparatively thin broad flame, which conforms somewhat to the long narrow shape of the openings in the lids G, over which the comparatively long narrow laundry-irons N are supported to be heated by the direct flame of the burner. The flame from the slit or opening $k^5$ of the burner K is sufficiently long to allow one ordinary laundry or tailor's iron to be quickly and effectively heated by a single burner, whereby economy both in constructing and using the apparatus is assured. In so far as the burner having the broad thin flame slit or opening $k^5$ is concerned it is immaterial whether the burner be provided with the cup-casing $k^2$ or not; but I prefer to use this casing, as it increases the heating effect of the burner by providing the air-superheating chamber $k^3$ around the mixing and flame tube $k$ to bring to a very high temperature the air admitted to the tube through its lower openings $k'$ to mingle with the fluid fuel issuing from the nipple $k^4$ into the tube. However this improved gas-heater be used, whether for heating laundry-irons or for general cooking by boiling or frying food substances or for baking griddle-cakes, the operation of the burners in superheating the air entering the main casing or frame A to support combustion is substantially the same, and is as follows: After the burners have been lighted a while the heat given off laterally from them will heat the inner wall C of the apparatus, and this wall will heat the atmospheric air admitted through the upper openings $a^3$ of the outer frame A into the chamber E between the wall C and frame A, and the heated air will escape through the lower openings $c$ of or beneath the wall C and pass to and through the auxiliary superheating-chambers $k^3$ of the burners to their mixing-tubes $k$, to mingle therein with the gas from the supply-pipes L, and the fluid-fuel mixture of superheated air and gas will flame very hotly from the outer ends of the mixing-tubes of the burners. Should the outer cup-casings $k^2$ not be used on the burners, the air which had been superheated in the chamber E will pass therefrom directly into the air-supply orifices $k'$ of the stem of the burner, which then would be but an ordinary Bunsen burner, which might be used successfully in the heater; but the improved form of burner having the casing $k^2$ and final air-superheating chamber $k^3$ gives better results and therefore is preferred.

The drawings represent a gas-heater having three burners, and this will be a desirable size of heater for general use; but the apparatus may be made on the same general principles with but one or two burners or with more than three burners, as may be required.

Having thus described my invention, I claim as new and desire to secure by Letters Patent—

1. The combination, in a gas-heater of the character described, of a casing having a closed bottom and a side wall, at the upper part of which an air-inlet is provided, a plate or wall within the casing and forming between it and the casing an air-superheating chamber and also providing a lower opening admitting superheated air to the fire-chamber within said inner wall, and one or more Bunsen burners in said fire-chamber and provided with an outer cup-casing around the mixing and flame tube and forming an air-superheating chamber between the tube and cup-casing, substantially as set forth.

2. The combination, in a gas-heater of the character described, of a casing having a bottom shield which is a non-conductor of heat and a side wall, at the upper part of which an air-inlet is provided, a plate or wall within the casing and forming between it and the casing an air-superheating chamber and also providing a lower opening admitting superheated air to the fire-chamber within said inner wall, and one or more Bunsen burners in said fire-chamber and provided with an outer cup-casing around the mixing and flame tube and forming an air-superheating chamber between the tube and cup-casing, substantially as set forth.

3. The combination, in a gas-heater of the character described, of a casing having a closed bottom and an apertured or open top and a side wall, at the upper part of which an air-inlet is provided, a plate or wall within the casing and forming between it and the casing an air-superheating chamber and also providing a lower opening admitting superheated air to the fire-chamber within said inner wall, and one or more Bunsen burners in said fire-chamber and provided with an outer cup-casing around the mixing and flame tube which forms an air-superheating chamber between the tube and cup-casing, said burner or burners also having a narrow end slit producing a thin broad flame, substantially as described.

4. The combination, in a gas-heater of the character described, of a casing having a bottom shield which is a non-conductor of heat and an apertured or open top and a side wall, at the upper part of which an air-inlet is provided, a plate or wall within the casing and forming between it and the casing an air-superheating chamber and also providing a lower opening admitting superheated air to the fire-chamber within said inner wall, and one or more Bunsen burners in said fire-chamber and having an outer cup-casing around the mixing and flame tube, which forms an air-superheating chamber between the tube and cup-casing, said burner or burners also having a narrow end slit producing a thin broad flame, substantially as described.

5. The combination, in a gas-heater of the character described, of an open-topped casing provided with a bottom which is a non-conductor of heat, fluid-fuel burners in the heater fire-chamber, a griddle on the casing and providing an opening between them for escape of hot products of the burners, and a perforated heat-equalizing plate between the burners and griddle, substantially as set forth.

6. The combination, in a gas-heater of the character described, of a casing having a bottom and a side wall, at the upper part of which an air-inlet is provided, a plate or wall within the casing and forming between it and the casing an air-superheating chamber and also providing a lower opening admitting superheated air to the fire-chamber within the inner wall, fluid-fuel burners in said fire-chamber, and a griddle on the casing receiving the heat of the burners and providing an opening for escape of their hot products, substantially as set forth.

7. The combination, in a gas-heater of the character described, of a casing having a bottom and a side wall, at the upper part of which an air-inlet is provided, a plate or wall within the casing and forming between it and the casing an air-superheating chamber and also providing a lower opening admitting superheated air to the fire-chamber within the inner wall, one or more Bunsen burners in said fire-chamber and having an outer cup-casing around the mixing and flame tube, which forms an air-superheating chamber between the tube and cup-casing, and a griddle on the casing receiving the heat of the burners and providing an opening for escape of their hot products, substantially as set forth.

8. The combination, in a gas-heater of the character described, of a casing having a bottom which is a non-conductor of heat and a side wall, at the upper part of which an air-inlet is provided, a plate or wall held within the casing and forming between it and the casing an air-superheating chamber and also providing a lower opening admitting superheated air to the fire-chamber within the inner wall, fluid-fuel burners in said fire-chamber, and a griddle on the casing receiving the heat of the burners and providing an opening for escape of their hot products, substantially as set forth.

9. The combination, in a gas-heater of the character described, of a casing having a bottom which is a non-conductor of heat and a side wall, at the upper part of which an air-inlet is provided, a plate or wall held within the casing and forming between it and the casing an air-superheating chamber and also providing a lower opening admitting superheated air to the fire-chamber within the inner wall, one or more Bunsen burners in said fire-chamber and having an outer cup-casing around the mixing and flame tube, which forms an air-superheating chamber between the tube and cup-casing, and a griddle on the casing receiving the heat of the burners and providing an opening for escape of their hot products, substantially as described.

10. The combination, in a gas-heater of the character described, of a casing having a bottom and a side wall, at the upper part of which an air-inlet is provided, a plate or wall within the casing and forming between it and the casing an air-superheating chamber and also providing a lower opening admitting superheated air to the fire-chamber within the inner wall, fluid-fuel burners in said fire-chamber, a griddle on the casing receiving the heat of the burners and providing an opening for escape of their hot products, and a perforated heat-equalizing plate between the burners and griddle, substantially as set forth.

11. The combination, in a gas-heater of the character described, of a casing having a bottom and a side wall, at the upper part of which an air-inlet opening is provided, a plate or wall within the casing and forming between it and the casing an air-superheating chamber and also providing a lower opening admitting superheated air to the fire-chamber within the inner wall, fluid-fuel burners in said fire-chamber, and a griddle on the casing receiving the heat of the burners and providing an opening for escape of their hot products, said griddle made smaller marginally than the top plate which overhangs the air-inlet openings of the casing, substantially as herein set forth.

12. The combination, in a gas-heater of the character described, of a casing having a side wall $a^2$ provided with upper openings $a^3$ and a bottom which is a non-conductor of heat, an inner wall C, having lower openings $c$ and providing an air-superheating chamber E between the casing and wall and an interior fire-chamber, fluid-fuel burners in said fire-chamber, and a griddle I on the top plate or flange D' of the wall C and providing an outlet $i^3$ for hot products of the burners, said griddle being smaller marginally than the plate or flange D', substantially as set forth.

13. The combination, in a gas-heater of the character described, of a casing having a side wall $a^2$ provided with upper openings $a^3$ and a bottom which is a non-conductor of heat, an inner wall C, having lower openings $c$ and providing an air-superheating chamber E between the casing and wall and an interior fire-chamber, fluid-fluel burners in said fire-chamber, a griddle I on the top plate or flange D' of the wall C and providing an outlet $i^3$ for hot products of the burners, said griddle being smaller marginally than the plate or flange D', and a perforated heat-equalizing plate J between the burners and griddle, substantially as set forth.

14. The combination, in a heater of the character described, of a casing having a bottom support and a side wall, at the upper part of which an air-inlet is provided, a detachable or renewable bottom shield which is a non-conductor of heat and rests on the bottom support of the casing, and a plate or wall within the casing and resting on the non-conducting bottom shield to hold it in place and providing an air-superheating chamber between the inner wall and the casing, said inner wall having lower openings above the bottom shield, which admit air to the fire-chamber within the inner wall, substantially as set forth.

15. The combination, in a heater of the character described, of a casing A, having a side wall $a^2$ provided with upper openings $a^3$ and provided with a bottom which is a non-conductor of heat, an inner wall C, provided with lower openings and forming an air-superheating chamber E between the casing and wall and an interior fire-chamber, an open-topped plate D, cast or formed in one piece with the wall C, and fastenings for said parts A C D, substantially as described.

JAMES GIBBONS.

Witnesses:
HENRY L. GOODWIN,
EDGAR TATE.